March 18, 1930.  A. O. AUSTIN  1,750,699
PROCESS AND APPARATUS FOR TESTING INSULATORS
Filed Aug. 2, 1922  5 Sheets-Sheet 1

Fig. 1

March 18, 1930.  A. O. AUSTIN  1,750,699
PROCESS AND APPARATUS FOR TESTING INSULATORS
Filed Aug. 2, 1922   5 Sheets-Sheet 2

Patented Mar. 18, 1930

1,750,699

UNITED STATES PATENT OFFICE

ARTHUR O. AUSTIN, OF BARBERTON, OHIO, ASSIGNOR, BY MESNE ASSIGNMENTS, TO THE OHIO BRASS COMPANY, OF MANSFIELD, OHIO, A CORPORATION OF NEW JERSEY

PROCESS AND APPARATUS FOR TESTING INSULATORS

Application filed August 2, 1922. Serial No. 579,133.

This invention relates to a method for testing the dielectric strength of insulators, and apparatus for carrying out the method, and has for its principal object the accomplishment of insulator tests in which the dielectric member is subjected to a higher voltage than the normal flash-over at atmospheric pressure.

The invention also contemplates the provision of a convenient and efficient apparatus, the accomplishment of efficient economical and easily applied tests, and other improvements in the process and apparatus as will appear hereafter.

The invention is exemplified in the combination and arrangement of parts shown in the accompanying drawings and described in the following specification and in the steps of the process therein described, and it is more particularly pointed out in the appended claims.

One of the objects of the invention is to overcome the objections to known methods of making dielectric tests on complete insulators composed of a number of parts, or upon single members to determine their ultimate dielectric strength.

As most complete insulators or insulating members have a sufficiently high dielectric strength so that they will flash-over before puncturing when tested at normal atmospheric pressures, it has been customary to immerse the insulators in oil when applying a voltage sufficiently high to determine the break down strength. This test has certain objectionable features which are eliminated by the improved method.

In the ordinary so-called oil puncture test, to determine the dielectric strength of complete insulators or insulator members the insulator is tested in a medium which has a different dielectric flux carrying capacity than that of air, consequently the electrostatic field conditions around the insulator are relatively quite different from operating conditions where the insulator operates in air.

The high dielectric strength of the oil may also confine the electrical stress to a very small portion of the insulator under test, whereas, it is desirable to have stress conditions approximately in the same relative values for various parts as would be under normal operating conditions. When tested under oil the very high resistance of the oil tends to concentrate the electro-static field at the edge of the electrodes or at the conducting surfaces in the insulator. This concentration may in some cases cause a break down of the insulator when tested under oil at a lower value than when tested in air and tends to reduce the voltage which can be applied.

When the insulator or members are subject to high electrical stress in air, the air may break down at the edge of the electrodes and form small streamers either thru the air from the electrodes or over the surface of the insulating members. These streamers tend to grade off the electrical stress and prevent a concentration of stress where the shell leaves the conducting surface, such as the electrodes or cement surface.

When tested by the improved method, these streams while held back are not prevented to such an extent as where the insulator is immersed in oil. The head formed by the streamers is comparatively small as the resistance to a streamer in air is very small compared to that in oil. When tested in air, the heat generated by the streamer is not in such intimate contact with the porcelain as in the case where the insulator is tested in oil. When the insulator is tested in oil, the streamer starting from the cement surfaces or the electrodes due to charging currents flowing over the surface are likely to produce intense heat. This intense heat owing to the $I^2R$ loss lowers the dielectric strength of the insulator. This together with the concentration of stress, as before explained, may cause the break down of a member much below what it would withstand except for these conditions. This gives misleading information as to the factor of safety provided in the insulator to meet electrical stresses of severe magnitude or for normal operating voltages.

When tested in oil, this heating by the charging current together with the concentration of stress make it necessary to perform the test very quickly, so as to eliminate the discrepancies from this cause as far as possible. A short time test makes it difficult to obtain accurate readings, which difficulty would be largely eliminated by the improved method.

When insulators intended for use in the air are tested in oil to determine their dielectric strength, the test is inconvenient, as it is necessary to keep the oil in good condition, and the insulators when covered in oil are difficult to handle. In the improved method, no oil is present to occasion difficulties of this nature. It is usually necessary to clean off the oil before parts tested in oil are assembled.

It is well known that in addition to obtaining break downs to determine the factor of safety provided for an insulator, it is often advisable to test an insulator or a member at a higher value than can be placed on it at flash-over voltage under ordinary atmospheric conditions.

When the insulator is tested either partially or wholly under oil, various parts of the insulator may be subjected to relative stresses quite different from that under which it will operate. It is evident that where the flange of the insulator is partially covered with oil that this portion may receive little or no stress as compared to the portion which is surrounded by air. It, therefore, follows that if the piece can be tested in air at the desired voltage, a more thorough test will be obtained on all its various parts.

By regulating the air pressure, it is possible to prevent streamers causing flash-over as under test conditions at normal atmospheric pressure. If the air pressure is increased sufficiently, all flashovers of the insulator or parts may be prevented for a given voltage. This will eliminate surges set up by the flash-overs where desired.

Figure 1:
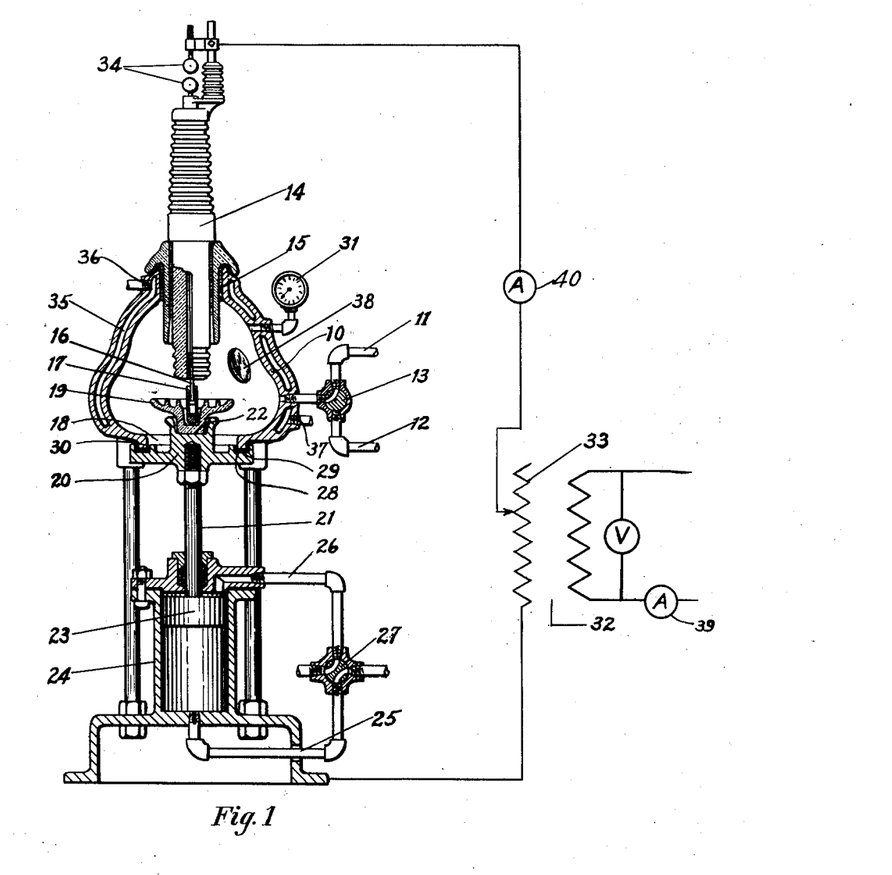
Fig. 1 is a vertical sectional view showing one form of apparatus for performing the process comprised in the invention.

In the apparatus shown in Fig. 1, the numeral 10 designates a shell or casing having an air inlet 11, and an outlet 12. The inlet and outlet are selectively connectible with the interior of the casing 10 and controlled by a two-way valve 13. A bushing of dielectric material 14 passes thru an opening 15 in the casing 10 and makes an air tight connection with the casing. A conductor 16 passes thru the center of the bushing 14 and is provided at its lower end with a terminal member 17 which has a limited vertical movement on the conductor 16. The lower portion of the casing 10 is provided with an opening 18 thru which an insulator 19 may be inserted. A vertically movable head 20 carried on a piston rod 21 is provided with a seat 22 for receiving the insulator 19 and for moving the insulator into and out of the casing 10 thru the opening 18. The lower end of the piston rod 21 is connected with a piston 23 which slides in a cylinder 24. Fluid under pressure may be admitted to either end of the cylinder 24 thru pipes 25 and 26 controlled by a four-way valve 27. When one end of the cylinder is connected with the source of fluid pressure, the other end will be open to atmosphere; in this way the piston 23 may be moved in either direction to carry the insulator 19 into and out of the casing 10.

The head 20 is provided with a seat 28 for receiving a gasket 29 which is pressed against a downwardly projecting flange 30 surrounding the opening 18, thus making an air tight closure for the chamber within the casing 10. A gage 31 indicates the pressure within the casing. A transformer 32 has its high potential winding 33 connected thru a ball spark gap 34 with the conductor 16 which extends thru the bushing 14. The other end of the winding 33 is grounded upon the frame work of the apparatus and so connects with the head 20 which carries the insulator 19. The opposite sides of the insulator 19 are thus subjected to the desired potential for testing purposes, and the distance the balls 34 are separated from one another will indicate the potential impressed upon the insulator.

The wall 10 may be jacketed as indicated at 35 for receiving a temperature controlling medium, there being conduits 36 and 37 to provide circulation of the medium thru the jacket. It may be necessary to heat the walls of the chamber at times to prevent moisture of condensation within the chamber. The air may be dried before it is introduced into the chamber for this same purpose. In order that the operator may observe the action within the chamber a window 38 is provided thru the casing wall. Ammeters 39 and 40 in circuit with the transformer windings indicate the operation of the device by the readings they show. The gap between the balls 34 can be adjusted to determine the voltage impressed.

It is a well known principle that an increase in air pressure correspondingly increases the resistance of an insulator in the air to flash-over. In the present invention, advantage is taken of this principle to enable the operator to subject the insulators being tested to increased potentials.

In operation, the supporting head 20 is lowered to permit an insulator 19 to be seated upon the head. The piston 23 is then moved upwardly until the opening 18 is hermetically sealed. When the insulator 19 is carried into the casing 10, the terminal member 17 will make contact with the pin socket, the terminal member being sufficiently movable to insure contact with the insulator but to prevent the pressure of the movable head 20 from clamping the insulator between the terminal member and the contact head. After the insulator is in place and the opening 18 sealed, the valve 13 is moved to admit air under pressure to the chamber, thus raising the pressure within the chamber to increase the resistance of the flash-over path to the desired value. The terminal 17 is then subjected to the potential used in making the test, and if the dielectric strength of the insulator meets the requirements there will be no break down due to puncture of the insulator. If the insulator should puncture, this fact will immediately appear from the appearance of a power arc between the balls 34. In this way the insulator may be subjected to a potential greater than that of its flash-over voltage at atmospheric pressure, thus insuring the insulator against the development of dielectric weakness which might not at first appear if the potentials were not carried above that of flash-over at atmospheric pressure.

Figure 2:
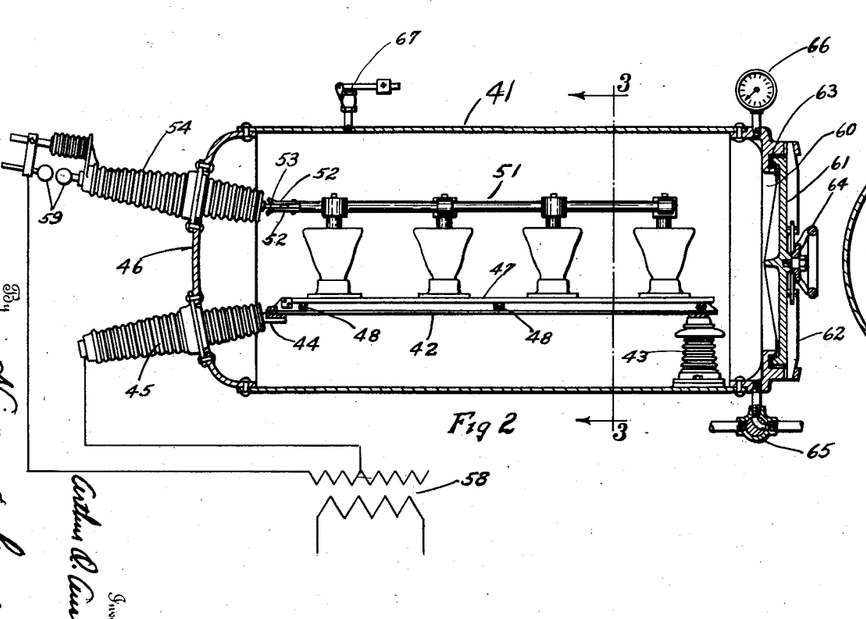
Fig. 2 is a vertical sectional view of a modified form of apparatus for testing a plurality of parts simultaneously.
Figure 3:
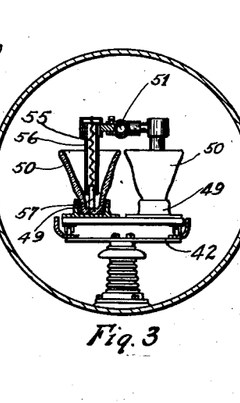
Fig. 3 is a vertical section substantially on line 3 of Fig. 2.

In Figs. 2 and 3 there is shown a form of apparatus for testing a plurality of insulator parts simultaneously. In this apparatus a casing 41 is provided, having a track 42 arranged therein and supported at one end by a pedestal insulator 43. The inner end of the track 42 is carried on a conductor rod 44 which extends thru a bushing 45 projecting thru the end wall 46 of the casing 41. A carriage 47 is provided with rollers 48 which travels on the track 42 and the face of the carriage 47 is provided with seats 49 for receiving insulator parts 50 to be tested. Connection is made to the interior of the insulator parts 50 thru a common lead or bus bar 51, which is provided with spring clips 52 for engaging a conductor 53 extending thru a bushing 54 in the end plate 46. Connection is made from the bar 51 to the interior of the insulators by means of fuse wires 55, preferably enclosed in glass or porcelain tubes 56; the lower ends of the tubes having contact pieces 57 cemented therein and connected with the lower ends of the fuse wires. The contact members 57 rest on the bottom of the insulator 50 and support the bar 51. Test voltage is supplied to the bar 51 from a transformer 58 connected thru a ball spark gap 59 to the conductor 53. The end of the casing 41 opposite the bushings 45 and 54 is provided with an opening 60 having a cover 61 provided with a quick acting lock 62 by which the cover is pressed tightly against a gasket 63 for forming an air tight closure for the opening 60. Any suitable form of lock for the cover 62 may be used, the form shown in the drawing being a well known type having wedge acting bolts operated by a hand wheel 64. A valve 65 is provided for supplying air under pressure to the interior of the casing in a manner similar to that described in connection with Fig. 1 and a gage 66 may also be connected to the test chamber for indicating pressure therein. If found desirable, this form of test chamber may be provided with a heating or cooling jacket in the manner already described in connection with Fig. 1.

In operating the device, the rack 47 with the insulator parts in place is run into the test chamber and the bus bar 51 with its connecting fuses is placed in position to connect the interior of the insulator parts to the source of electro-motive force. The pressure is then raised to the desired amount so as to permit of a voltage above that which would produce flash-over under the working conditions of the insulator parts. The required voltage is then impressed upon the apparatus and permitted to remain long enough to test the dielectric strength of the parts. This form of apparatus may be provided with observation windows if desired, similar to that shown in Fig. 1 so that the operation may be observed while the chamber is closed. If any insulator is punctured, however, the fact will appear when the parts are removed by the fact that the fuse 55 by which the potential was supplied to the defective insulator will be blown after puncture.

The fuse connections not only disclose the defective insulators, but when an insulator is punctured it is desirable to disconnect it from the circuit immediately so that the required potential may be permitted to remain upon the other parts being tested. As soon as puncture occurs the resistance at that point is so decreased that sufficient current will flow to blow the fuse and thus break the circuit thru the defective part.

Figure 4:
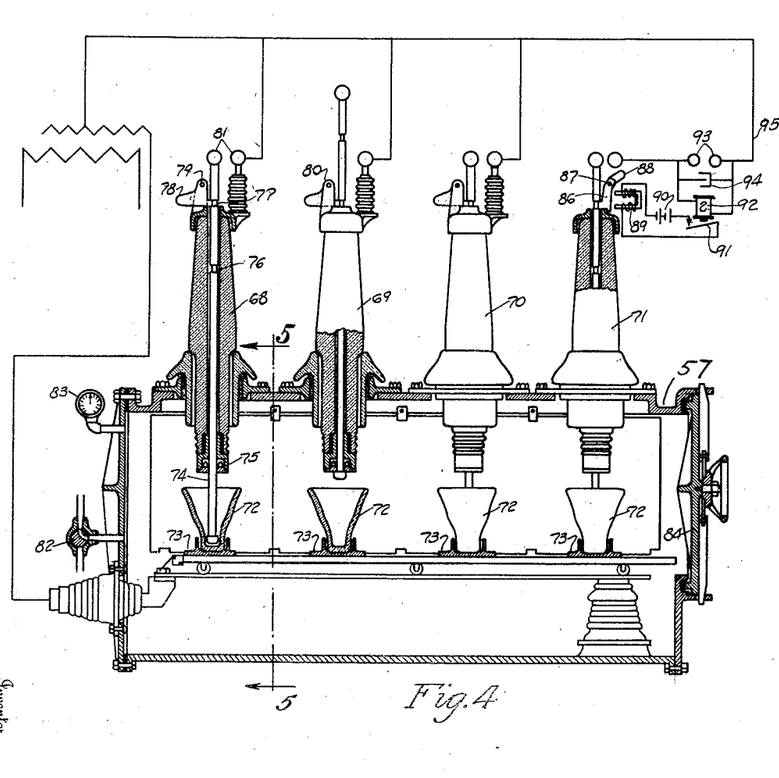
Fig. 4 is a view similar to Fig. 2 showing another modification of the testing apparatus.
Figure 5:
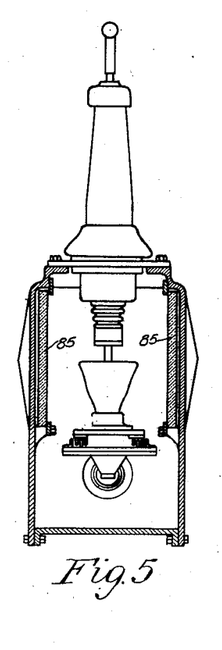
Fig. 5 is a section substantially on line 5—5 of Fig. 4.

In the form of the apparatus shown in Figs. 4 and 5, the casing 57 is provided with insulator bushings 68, 69, 70 and 71. Any desired number of bushings may be employed, depending upon the number of insulator parts to be tested simultaneously. These parts 72 are placed in seats 73, having electrical connection with the frame of the casing. Contact is made with the interior of the parts 72 by means of plunger rods 74 which are mounted to slide thru the interior of the bushing and which are provided with packing glands 75 to prevent escape of air about the plunger rods. The upper end of the rods 74 are provided with spaced grooves 76 and 77 for retaining the rods in raised and lowered positions respectively. A latch 78 is pivotally mounted at 79 to engage the grooves 76 and 77. The latch 78 is weighted at 80 to move automatically into the locking grooves. Potential is supplied to the plunger 74 thru ball spark gaps 81. These gaps are not essential however and may be omitted when the relay is used. When a part is punctured a power arc will appear between the balls of the gap 81 and the attendant will then strike the lower side of the projection 80 with an insulated pole, thus releasing the latch. The air pressure on the interior of the chamber will force the plunger upwardly and as soon as the groove 76 comes opposite the latch the plunger will be locked in its uppermost position and the test on the other parts may be continued.

Air pressure is supplied to the test chamber thru a valve 82 and the pressure is indicated by a gage 83. A closure 84 similar to that shown in connection with Figures 2 and 3 may be used for closing the end of the chamber. Plates of dielectric material 85 may be interposed between the charged parts and the walls of the casing as a safeguard against arcing to the walls. In place of the manually operating catch shown in connection with bushings 68, 69 and 70, the plungers 74 may be provided with electrically operated catches so that they will be automatically released when the part is punctured. One arrangement is the form of catch shown in connection with bushing 71; as there shown, a catch 86 is pivoted at 87 and provided with a weight 88 for automatically moving it into operating position. An electromagnet 89 is arranged adjacent the catch 86 so that when the magnet is energized, it will release the catch. The magnet 89 is connected with a battery 90 and controlled by the contact member 91 of a relay 92. The relay 92 is arranged in parallel with a ball spark gap 93 and a condenser 94, and in series with the line 95 thru which potential is supplied to the plunger 74.

When puncture occurs, sufficient current will pass thru the winding of the relay 92 to close the contact 91 and thus energize the magnet 89 and automatically release the catch 86, permitting the plunger 74 to move upwardly under the air pressure within the chamber. Altho a very high potential is supplied thru the conductor 95, the current which flows is of relatively small value and is not sufficient to be depended upon for operating the catch 86. It is, therefore, usually advisable to provide a relay and supplementary source of current as indicated.

It sometimes occurs, however, that at the time of a break or other disturbance, surges will occur in the main line 95 which would be sufficient to burn out the relay 92 if it were not protected. The spark gap 93 and the condenser 94 are for the purpose of guarding the relay 92 against surges of this nature. The gap will permit discharge, thus forming a shunt about the relay, and the condenser furnishes capacity for absorbing energy which might otherwise expend itself thru the relay winding.

Not only is the process and apparatus useful for conducting routine tests of insulators for commercial installations, but it may also be used to an advantage for testing the ultimate dielectric strength of types of insulators by permitting the voltage to be raised until the insulator is punctured.

Figure 6:
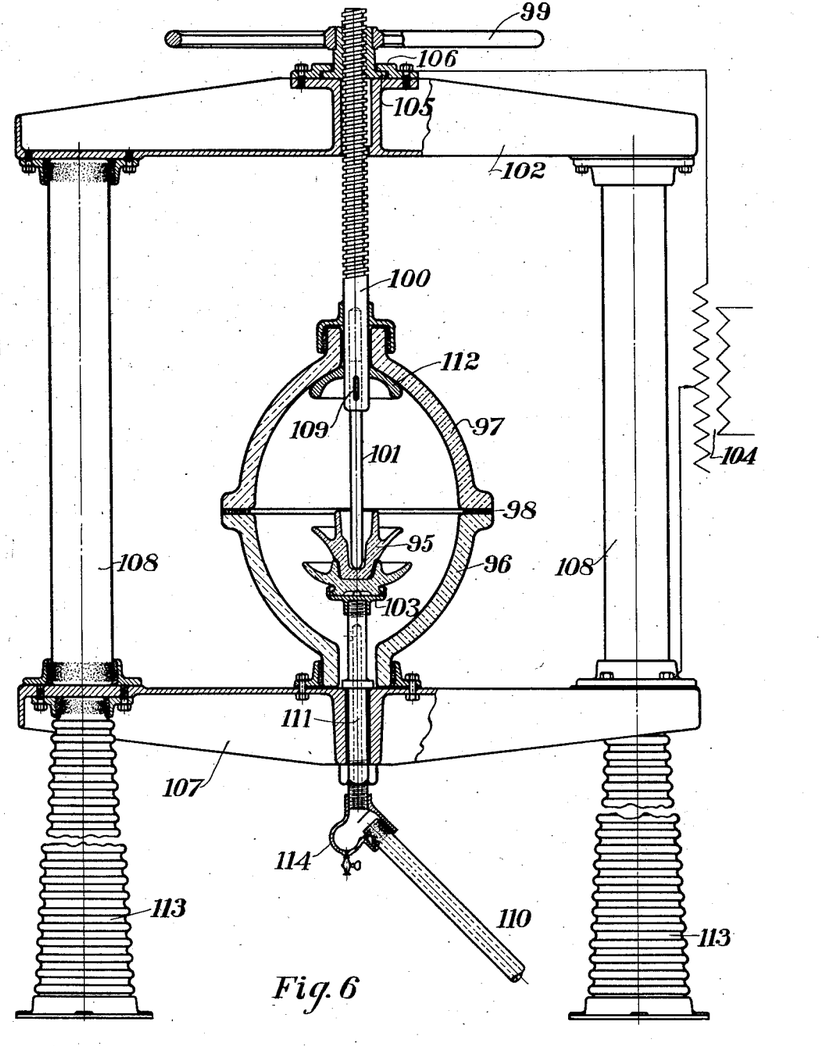
Fig. 6 is a vertical section showing a different form of apparatus especially applicable to break down tests.

An insulator or dielectric member to be given a break down test is shown at 95, Fig. 6. The insulator is enclosed by two dielectric shells 96 and 97 which form an air tight joint with the gasket 98. In making a test the wheel 99, whose center forms a nut engaging the threaded rod 100 is rotated in the proper direction. This raises the upper cone or cup 97 together with the electrode 101. The threaded member 100 has a groove or keyway with a corresponding member attached to the upper yoke 102 which prevents rotation when the wheel 99 is rotating. It is evident that other means may be provided for raising and lowering the cone 97, such as a hydraulic or air piston or a cam or by any means which will produce sufficient pressure.

The insulator or dielectric may consist of one or more members and may be equipped with any type of electrode desired. The insulator 95 is shown setting in a cup 103 which forms one terminal and is in electrical contact with one end of the testing transformer 104. After placing the insulator in the electrode cup 103, the pilot 99 is rotated so as to lower the cup 97 and electrode 101 attached to the rod 100.

The center of the wheel 99 has a flange 105. This flange is over-lapped by a wing 106 attached to the upper yoke 102. This construction enables the threaded rod 100 to be forced downward so as to make a tight joint between the members 96 and 97 and the gasket 98. The two yokes 102 and 107 are held together by insulating members 108. A slight adjustment is preferably provided in the electrode 101 by a pin sliding in a slot 109. This insures contact between electrode 101 and the insulator or test piece, but at the same time prevents exerting any pressure.

After the test chamber formed by 96 and 97 is tightened by the use of the wheel 99, air pressure or air is admitted by the tube 110. This is preferably an insulating member such as a porcelain, fibre or rubber tube. When the member 110 is an insulating member it is not necessary to ground the yoke 107 or remove the air connection therefrom. It is evident that the latter may be done if desired however if there is provided a valve which will retain the pressure in the test chamber while the member 110 is disconnected. By admitting air through the tube 110 in the hollow spindle 111 it is possible to raise the pressure in the test chamber. The increased air pressure will cause the insulator to flash-over at a higher value. By increasing the air pressure sufficiently, proving tests may be made at voltages considerably above the flash-over voltage at atmospheric pressure and members under test may be actually punctured without flashing-overs. As the field will be distorted but little about the insulator there will be no hot spots compared to those found in making an oil puncture test. It is evident the test is a valuable one in making break down tests. The inconveniences of making tests in oil is avoided and the test will be more comparable to those under extreme conditions or where it is desired to place a factor of safety on the insulator at atmospheric pressure.

As most insulators fail in oil puncture tests at approximately thirty-five to fifty percent over their flash-over in atmospheric pressure, it is not necessary to use very high pressures in the test apparatus, for a pressure of from one to two atmospheres will usually permit placing a voltage in excess of this value. If flash-over of the member inside the test chamber be very high, care must be taken to see that flash-over does not occur around the outside of the test chamber. The flash-over around the outside may be improved to some extent by proper screening, even on the outside or inside of the chamber. One method is shown by the use of an internal screen 112, although a more efficient type such as an insulated control may be used to advantage in some cases. Where the transformer is not grounded or the center of the transformer is grounded making both ends alive, it is necessary to insulate the yoke 107. This is accomplished by insulators 113. These insulators which are usually hollow may be used to supply air pressure to the test chamber by connecting them up so that they may be used in place of the insulating tube 110. It frequently happens that there is some condensation due to water in the air supply. This is trapped by the small reservoir 114 and is allowed to escape from time to time. This tends to prevent the water running down the tube 110 and short circuiting same when the yoke 107 is not grounded or when this end is the high voltage end. With the arrangement shown, either end of the system may be grounded as desired. The test arrangement as shown is particularly suitable for break down tests owing to the favorable field conditions as compared to conditions where a metal chamber is used, or where the test is made in a bath of oil having different specific inductive capacity than air.

The test also has the advantage of eliminating the high concentrated stress and intense heat which takes place in testing the insulator under oil to obtain values higher than the normal flash-overs in air. In a test of this kind there is also an absence of surges which are often set up owing to discharges over the surface in contact with the oil. These discharges do not necessarily flash-over the piece but as they drive away the oil and change the relative electro-static capacity of the piece they may set up severe conditions making measurements uncertain.

In the method shown, part of the surface is not eliminated from test as is often the case where the member is tested while partially or wholly in oil, as the flash-over of the insulator may be regulated to any desired flash-over by changing the air pressure surrounding same.

Tests also may be made quickly and easily, and without necessity of cleaning the insulators after making the test as in case of oil puncture tests. In making oil puncture tests, it frequently happens that the dielectric strength of the oil is greatly impaired after a few tests or deteriorates with time owing to the absorption of water. In the improved method of tests, this difficulty is eliminated as a fresh supply of air is used at each test and the air is little, if any, impaired between testing.

Figure 7:
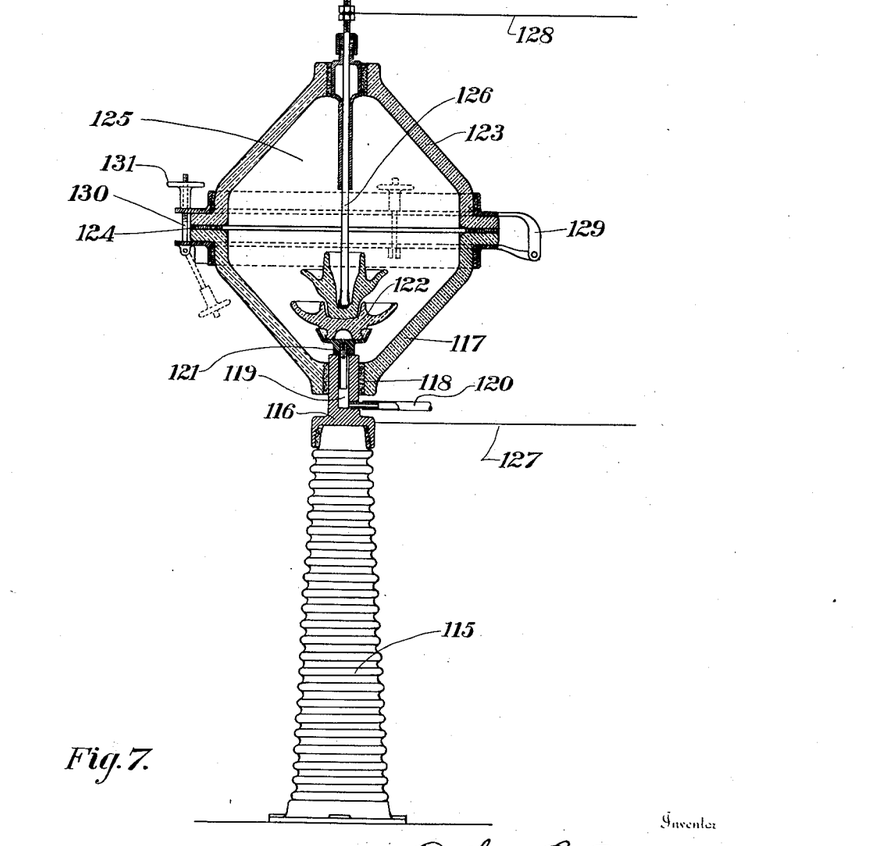
Fig. 7 is a view similar to Fig. 6 showing another form of apparatus.

In the form of the invention shown in Fig. 7 a pedestal insulator 115 supports a terminal member 116 on which a bowl shaped member of dielectric material 117 is mounted and with which it forms an air tight joint at 118. The fitting 116 has an opening 119 therein, thru which air or gas pressure is supplied to the interior of the member 117 thru a connection 120. A seat 121 rests loosely on the terminal 116 within the bowl 117 and an insulator part 122 may be placed within the seat 121. A cover 123 similar to the member 117 is fitted to the rim of the member 117 and a gasket 124 forms a tight joint between the parts 117 and 123, thus forming a closed chamber 125 about the test part. A terminal rod 126 passes thru the upper portion of the cover 123 in position to make contact with the test piece 122. Test potentials are supplied by connections 127 and 128 to the terminals 116 and 126 respectively. The parts 117 and 123 are connected by a hinge 129 and are firmly secured with one another by clamping bolts 130 and hand wheel 131. The operation is similar to that shown in Fig. 6.

There are many ways in which the test may be applied without changing the principle involved. The test piece may be placed on a piston which with a cylinder forms the wall of the test chamber, the movement of the piston raising the pressure. A special room may be provided so that it can be sealed and the pressure raised, and tests carried on as usual. The presence of ozone and nitric and nitrous compounds formed by the electrical discharge, however, make the latter objectionable. The method is particularly applicable to the testing of parts where it is desired to obtain accurate readings. The spark gap in series may be reduced so that they will have negligible effect in setting up surges, or they may be left off.

In making breakdown tests in oil, severe surges are likely to be set up. These surges may cause damage but their duration is so short that their magnitude cannot be determined. By testing in air or gas, this surge is practically eliminated until a part punctures or flashes.

In oil puncture tests the heat and intense localization of stress often causes an etching of the surface causing damage to the material, even if it is not broken down. In the improved test it is possible to make proving tests of high magnitude and still use the material. This results in a considerable saving where even a small percentage are subjected to abnormal proving tests. After releasing the air pressure, the chambers may be opened and a flash-over voltage applied to see which members have passed or failed.

I claim:—

1. An insulator testing device, comprising a housing, means for supporting an insulator within said housing, a pair of terminals for subjecting said insulator to electric pressure while within said housing, and means for supplying air pressure to the interior of said housing, said terminals being separated at their point of closest approach by said insulator when in test position.

2. An insulator testing device, comprising an air tight housing, means for supporting an insulator within said housing, terminals within said housing for engaging different portions of said insulator and means for subjecting said terminals to potential differences greater than the normal flash-over voltage of the insulator at atmospheric pressure, said terminals being separated at their point of closest approach by said insulator when in test position.

3. An insulator testing device, comprising a housing having an opening thru the wall thereof, a closure for said opening, means for forcing said closure against said opening to prevent escape of air from said housing, terminals for engaging opposite portions of an insulator within said housing, and means for raising the pressure within said housing to an amount greater than atmospheric pressure, said terminals being separated at their point of closest approach by said insulator when in test position.

4. An insulator testing device comprising a housing having an opening to permit insertion and removal of insulators to and from said housing, terminals extending into said housing to subject an insulator therein to electric voltage, means for raising the air pressure within said housing to an amount above atmospheric pressure, and means for indicating the pressure within said housing, said terminals being separated at their point of closest approach by said insulator when in test position.

5. An insulator testing apparatus comprising a casing, means for raising the pressure within said casing above atmospheric pressure, means for supporting a plurality of insulators within said casing, means for subjecting said insulators to a test voltage, and means for disconnecting an insulator from the source of potential in case the insulator fails under test while retaining the connection of the other insulators with said source.

6. Insulator testing apparatus comprising a casing, means for supporting a plurality of insulator parts within said casing, means for supplying electric potential to said parts and means for automatically disconnecting a part that fails under test.

7. Insulator testing apparatus comprising an air tight casing, means for supporting within said casing a plurality of insulator parts to be tested, connection for supplying electric potential to said parts and means for automatically breaking said connection with any one of said parts that fails under test while permitting the other parts to remain in connection with the source of electrical potential.

8. Insulator testing apparatus comprising an air tight casing, means for maintaining an air pressure within said casing greater than atmospheric, means for supporting a plurality of insulator parts within said casing, means for supplying electric potential to said parts, and automatic overload cutout devices individually connected with the circuits of the insulator parts.

9. Insulator testing apparatus comprising an air tight casing, means for maintaining a pressure greater than atmospheric within said casing, means for supporting a plurality of insulator parts within said casing, electric circuits for supplying potential to said parts and cut out devices for each of said parts actuated by the air pressure within said casing.

10. Apparatus for testing insulators comprising a closed housing, a support for insulators to be tested disposed within said housing and insulated therefrom, and means insulated from said support for applying test voltage to an insulator within said housing.

11. Apparatus for testing insulators comprising a housing, means for subjecting the interior of said housing to pressure, a support within said housing insulated therefrom, a conductor lead connected with said support, and an electrode within said housing insulated from said housing and said support.

12. Mechanism for testing insulators comprising a housing, means for subjecting the interior of said housing to pressure, a support within said housing insulated therefrom, a lead connected with said support and extending to a position outside of said housing, and an electrode disposed within said housing and insulated from said support, said electrode having means for engaging an insulator at a point thereon separated by said insulator from said support.

In testimony whereof I have signed my name to this specification on this 29th day of July, A. D. 1922.

ARTHUR O. AUSTIN.